June 21, 1949.　　　　　G. L. DIMMICK　　　　　2,474,098
PHOTOMETRIC MEASUREMENT OF LIGHT VALUES USING AUTOMATIC
GAIN CONTROL IN PHOTOMULTIPLIER TUBES
Filed March 29, 1946　　　　　　　　　　　　　2 Sheets—Sheet 1

INVENTOR.
Glenn L. Dimmick
BY
ATTORNEY

June 21, 1949.    G. L. DIMMICK    2,474,098
PHOTOMETRIC MEASUREMENT OF LIGHT VALUES USING AUTOMATIC
GAIN CONTROL IN PHOTOMULTIPLIER TUBES
Filed March 29, 1946    2 Sheets-Sheet 2
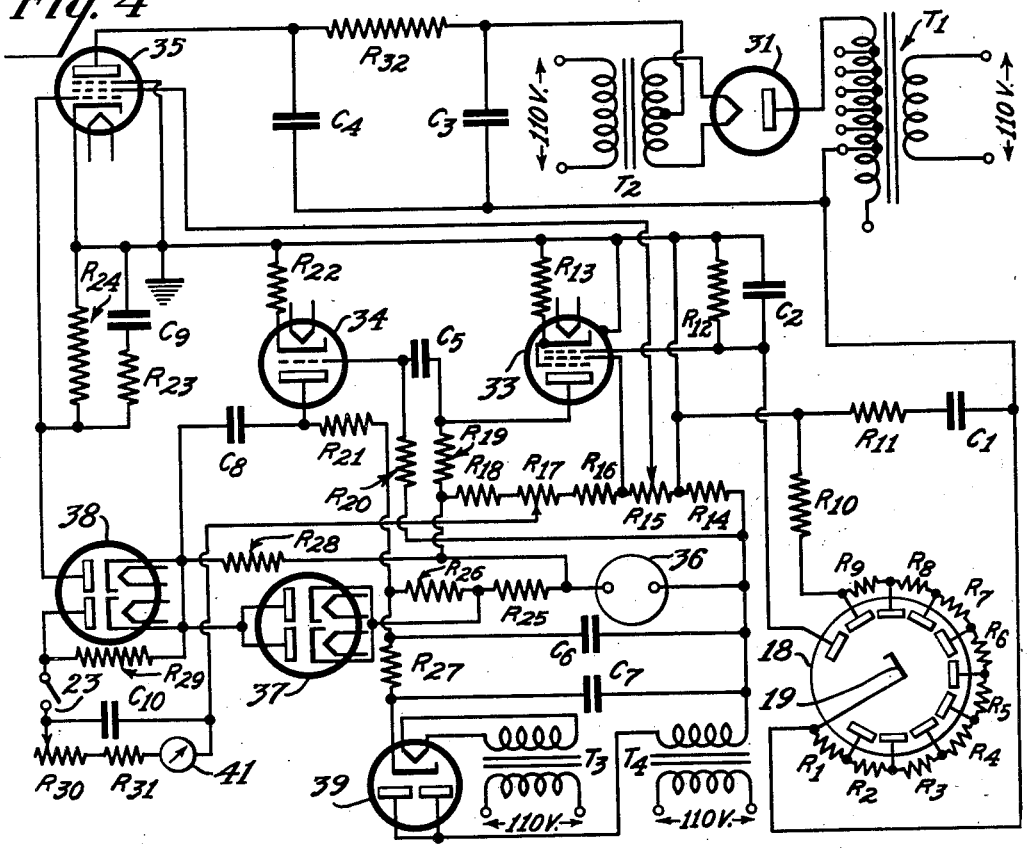
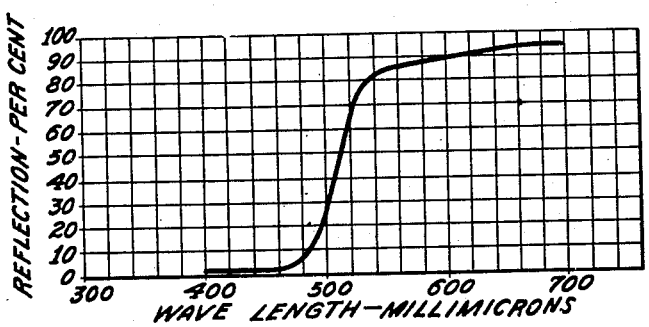
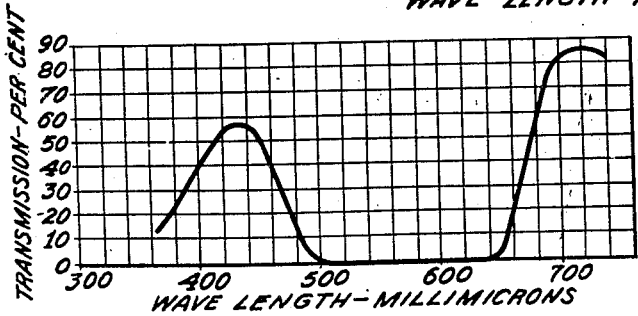
INVENTOR.
Glenn L. Dimmick
BY
ATTORNEY Patented June 21, 1949

2,474,098

UNITED STATES PATENT OFFICE 2,474,098

PHOTOMETRIC MEASUREMENT OF LIGHT VALUES USING AUTOMATIC GAIN CONTROL IN PHOTOMULTIPLIER TUBES

Glenn L. Dimmick, Indianapolis, Ind., assignor to Radio Corporation of America, a corporation of Delaware Application March 29, 1946, Serial No. 657,974

3 Claims. (Cl. 88—14)

This invention relates to improvements in apparatus for measuring light values.

More specifically, it relates to measuring transmitted or reflected light values as a function of wave length of light received from a light source and to measuring intensity of the light source, itself.

The invention has particular application in the many fields such as the textile coloring and paint industries where large numbers of color comparisons must be made daily. Color comparisons and standardization are a vital part of almost any industry marketing colored products and a device which enables the necessary comparisons to be accurately made is a prime necessity.

At one time, the only means of comparing colors was the unaided human eye. Although the eye is excellently adapted to distinguish small variations in color, there are many subjective factors introducing differences in individuals doing the observing which cause the results of visual observations to vary from person to person and even at different times when made by the same person. The invention of mechanical devices, including photo-electric cells, for making color comparisons, therefore resulted in great advances in the color industry.

The main objective since the introduction of color evaluating devices has been to manufacture a machine which would be perfectly stable under varying conditions of operation such as varying intensity of light source and which would be also reasonably enough priced to enable its widespread use by small laboratories. Even the best of the color comparison devices which have been made to not exhibit a reasonable degree of stability. They have depended for their operation on extremely accurately shaped cams, for example, and have been sensitive to minor variations in vacuum tube characteristics and the inherent failings of all photoelectric tubes such as differences in color sensitivity, fatigue, and ageing. Moreover, they have been so expensive that relatively few potential users have been able to afford them. Others have been designed to sell in a more reasonable price range but were not dependable enough to give the accuracy demanded by industry and research laboratories.

It is an object of the present invention to provide an improved apparatus for comparing color values which is independent of variations in intensity of the light source.

It is a further object to provide an improved apparatus for comparing color values which is unaffected by the color-sensitivity of a photo-cell over a practical range of visible wave lengths.

Another object is to provide an apparatus for measuring color values which is independent of the spectral characteristics of the light source.

Another object is to provide apparatus for measuring color values in which a light beam from a standard automatically sets the overall gain of a photoelectric multiplier and measuring circuit, and in which the thus established gain is maintained substantially constant during a subsequent period in which light is being received by the photomultplier from a test sample.

Another object is to provide apparatus for measuring color values in which a light beam either transmitted through or reflected from a test sample is measured by a circuit which has been set to a gain which remains substantially constant during any one measuring period.

Another object is to provide apparatus for measuring color values in which the overall gain of the amplifying circuit is set many times per second.

Another object is to provide color measuring apparatus in which an electron multiplier is used as the light sensitive element.

Another object s to provide improved apparatus for comparing intensity of light with that of a standard.

Another object is to provide color measuring apparatus which is both reliable and relatively inexpensive as well as simple to operate.

Previous spectrophotometers have included those of the non-recording type. In one class of this type of instrument, visual measurements are made by observation of a split field in which are juxtaposed areas illuminated respectively by the standard and the sample. Another class utilizes flicker photometry in which there is rapid interchange of the standard and test specimen which are alternately observed by the eye. Both of these methods are open to the usual errors involved when human evaluation is the deciding factor.

Several different types of recording spectrophotometers have also been devised. Most of these operate on the "null" principle. In this type, there is usually used connected to the anode of a photo-electric cell a D.-C. meter having a pole changing device. Light from a test specimen and a standard alternately impinges on the cathode of the phototube. The anode current is passed through the D.-C. meter in such a manner that all of the anode current pulses resulting from the light from the specimen pass through the meter in one direction and all the pulses due to the light from the standard go through the meter in the opposite direction. In order to measure reflectivity or transmission of the specimen, the response from the standard is cut down until the meter indicates zero current.

The "null" type of recording instrument is open to several serious disadvantages. Among them is the fact that the meter does not read a value proportional to the reflection or transmission of the sample but is always brought to a zero reading. The actual values must be taken from a calibrated test wedge. The making of the test wedges is difficult and expensive. Furthermore, the accuracy of the readings is a direct function of the overall sensitivity of the photosensitive device to different colors as well as of the color characteristics of the light emitted by the glowing lamp filament. Since the electron multiplier which it is desired to use in this device is much more sensitive in the green than in the red, it is possible to obtain more accurate readings in the green than can be obtained in the red part of the spectrum. Manually operated the "null" type spectrophotometer has another serious disadvantage. It is not possible to quickly turn through the complete spectrum and to visually observe the transmission or reflection values at each wave length.

In the principal embodiment of the present invention light from a single source which may be the exit slit of a spectrometer is split into two paths. Light following one of these paths is either passed through a transmission sample or allowed to reflect from a reflection sample and then is diffusely reflected onto the cathode of an electron multiplier phototube. Light following the other path is reflected from a standard sample and also is diffusely reflected onto the cathode of the photomultiplier tube. The paths are illuminated alternately, the alternations being very rapid and of short duration. The light impulses thus received by the multiplier tube are converted into anode current pulses. Those pulses which are the result of light being received from the standard are used to set the overall gain of the amplifying system. The alternate pulses which are the result of light being received from the test sample are recorded on a recording device such as a microammeter. The design of the automatic gain control circuit assures that the readings which are obtained on the recording device are not affected by the usual influencing factors such as variations in spectral sensitivity of the photomultiplier tube, color characteristics of the light source, intensity of the light source, or vacuum tube characteristics, and fatigue of the photomultiplier.

The invention will now be more specifically illustrated with the aid of the drawings of which, Fig. 1 is a diagram of the optical system and its relation to the generating of current impulses.

Fig. 4 is a circuit diagram of the gain control and measuring circuits.

Fig. 5 is a typical color curve obtained by measuring an opaque test sample with apparatus constructed in accordance with the invention.

Fig. 6 is another typical curve obtained by measuring a transmission test sample.

In order to compare the colors on two opaque surfaces or the color transmission of two transparent samples, it is necessary to measure their response to impinging light from some desired band width of the visible spectrum. Two opaque surfaces may be said to match in color when they reflect diffusely the same amounts of light for all parts of the visible spectrum. Likewise, two transparent samples may be said to match in color when they transmit the same amounts of light for all parts of the visible spectrum. The response of a surface to impinging light of varying wave lengths can, in the case of an opaque surface, be expressed as a percentage reflectance for each impinging wave length. The information derived from submitting the test surface to impinging light of many different wave lengths may be tabulated in graphical form and the color characteristic of the test specimen will then be represented by a curve in which the ordinates at each wave length will represent the percent reflectance at said wave length. Such a curve is illustrated in Fig. 5 which shows the response of a particular yellow surface when submitted to light of various wave lengths throughout the visible spectrum.

A photocell ordinarily doesn't distinguish between a change in intensity of light and a change in color. Hence, it usually follows that two samples cannot be compared merely by submitting them to some particular source of white light. It is usually necessary to specify the wave length of the incident light and it is preferred to use several wave lengths selected throughout the spectrum in order to get sufficient information to plot a curve.

Figure 1:
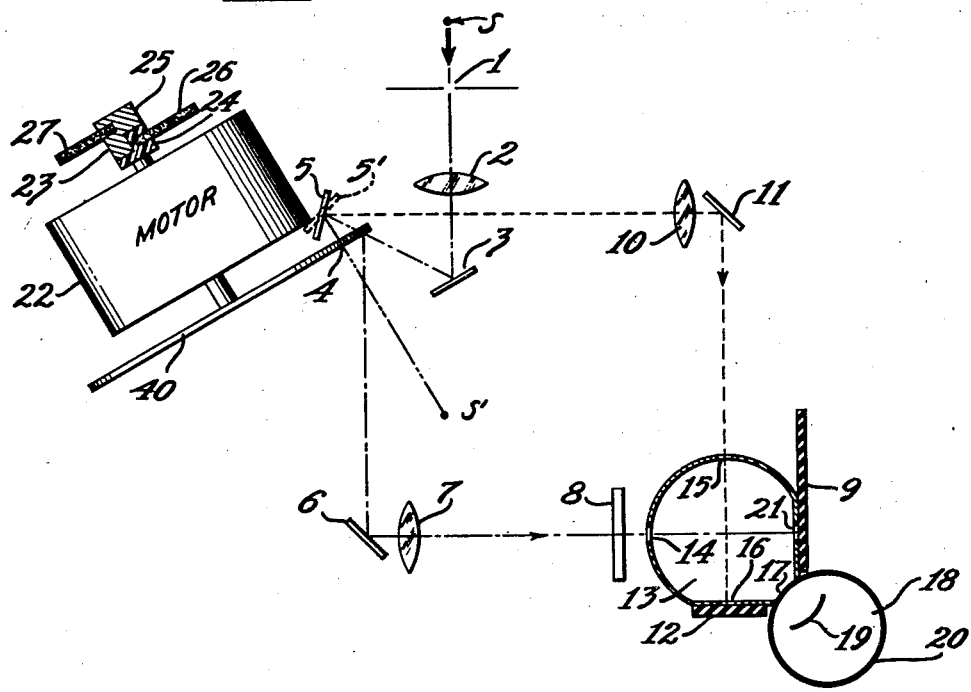

An optical system suitable for use in the invention is shown in Fig. 1.

By passing white light through a spectrometer, light of about any desired wave length may be obtained. Although spectrometers of various types may be used, a curved grating spectrometer is convenient and may be employed in this case. As shown in Fig. 1, light from a source S passes through the exit slit 1 of a spectrometer, then passes through a focussing lens 2 and strikes a mirror 3. From this mirror the light is reflected to mirrors 4 or 5. Lens 2 forms an image of the curved grating in the spectrometer on the mirror 4. The mirror 4 is on a disc 40 which is rotated at high speed by a motor 22. This mirror covers only a part of the disc 40 and reflects light for only a portion of each revolution of the motor 22. During another portion of each revolution of the motor, the light passes to mirror 5 where it is deflected along a path through lens 10 to mirror 11. Here it is deviated 90° and passes through window 15 in the small integrating sphere 13 and through another window 16 on the opposite side of the sphere to a white standard such as a block of magnesium carbonate 12. Light reflected from mirror 4 is again reflected from mirror 6 through lens 7 and into the integrating sphere through window 14. If a transmitting test sample is being measured it is placed at 8 or if a reflecting sample is used it is placed at 9 adjacent the window 21. If a transmitting test sample is to be placed at 8 and measured, a block of the white standard is placed at 9 and the recording meter, to be further described, is set at full scale reading. The transmitting sample is then inserted at 8 and measured in terms of the white standard. The integrating sphere is preferably smoked with magnesium oxide on its inner surface. From the exit window 17, light passes out of the integrating sphere into an electron multiplier 18, the cathode of which is shown at 19. A light shield 20 excludes stray light. Directly reflected rays from standard 12 and test sample 9 cannot reach the multiplier cathode. Only the light which is diffusedly reflected from the walls of the sphere can enter the electron multiplier.

Lenses 10 and 7 perform the function of reforming the image at mirror 4 upon the standard 12 and test sample 9. The rays of light passing through windows 21 or 16 have a cross sectional area considerably less than the area of the windows through which they are passing since it is desired to keep the light from striking the edge of any of the windows. It is quite necessary that all of the light from each beam gets thoroughly "integrated" before entering the electron multiplier.

As previously stated, the mirror 4 covers only a part of disc 40. It therefore, in the form of the invention now being described, acts as a light chopper when the disc rotates. Mirror 4 is shown in greater detail in Fig. 2. As shown in this figure a black mask 28 is placed over the mirror covering all of its surface except the area 29. The length of the arc of area 29 determines the duration of each light pulse directed through or upon the transmission sample or the reflecting sample as the case may be. The open arc 30 determines the duration of each light pulse directed along the alternate path to the standard 12. This latter pulse may be termed a gain control pulse and its function will be more fully explained with the discussion of the circuit diagram.

Control circuit

Fig. 4 is a circuit diagram showing how an electron multiplier 18 such as a 1P22 is connected into an automatic gain control circuit such that its response to light pulses incident on the cathode 19 will depend only on the wave length of the light and be independent of variations in intensity of the light source. The nature of the circuit is also such that differences in the sensitivity of the photomultiplier tube to various wavelengths throughout the spectrum is compensated for.

A.-C. line voltage is stepped up to 610 v. by the transformer $T_1$ and rectified by the diode 31 which may be a type 2X2. The transformer $T_2$ supplies filament voltage to the rectifier tube 31 while capacitances $C_3$ and $C_4$ and resistor $R_{32}$ smooth out the rectified voltage in the usual manner. This rectified input voltage is connected through a gain control tube 35, which may be a 6AC7, to potential divider $R_1$ to $R_{10}$, thus supplying voltage to the cathode, anode, and the nine dynodes of the multiplier tube 18.

Since the resistors $R_1$ to $R_{10}$ in series are connected as the load resistors in the plate circuit of the gain control tube 35, the voltage appearing across these load resistors depends upon the voltage applied to the control grid of the control tube. The control tube is shown as a 6AC7 which is connected as a pentode so as to obtain a very high voltage amplification. Since the sensitivity of the photomultiplier is a very sensitive function of the voltage applied to its dynodes, the above arrangement provides a means for producing a very large change in multiplier sensitivity with a small change in voltage on the control grid of tube 35. As an example, when the voltage on the control grid of tube 35 is varied 0.2 v. the sensitivity of the photomultiplier varies about 5 to 1.

Between the cathode and control grid of tube 35 is inserted resistor $R_{24}$ in parallel with capacitor $C_9$ and resistor $R_{23}$. When no energy is supplied to this part of the circuit the capacitor is discharged and the control grid is at cathode potential. Under this condition, a minimum amount of voltage is stored in tube 35 and a maximum amount appears across $R_1$ to $R_{10}$, thus giving maximum sensitivity to the multiplier.

When pulses of light strike the cathode of the photomultiplier, they produce pulses of current in the anode circuit which includes $R_{12}$. The voltage appearing across $R_{12}$ is impressed upon the control grid of the tube 33 which may be a 6SH7 connected as a pentode and amplified voltage appears across plate resistor $R_{19}$. This voltage is coupled to the grid of tube 34, which may be a 6J5, by means of capacitor $C_5$ and resistor $R_{20}$. A voltage pulse having still greater amplification then appears across plate resistor $R_{21}$ of tube 34. The voltage pulses appearing across $R_{21}$ are fed thru capacitor $C_8$ to resistor $R_{28}$. A constant voltage discharge tube 36, which is preferably a VR105, is connected in series with $R_{28}$ so that the difference in their voltages is impressed thru the diode 38 upon resistor $R_{24}$ and capacitor $C_9$. The voltage across $R_{28}$ is of opposite polarity to that appearing across the constant voltage tube 36. When the voltage appearing across $R_{28}$ is less than the voltage across tube 36 a positive potential is impressed upon the upper cathode of diode 38 and no current flows in resistor $R_{24}$ and no charge is stored in capacitor $C_9$. When the peak voltage appearing across $R_{28}$ rises above that of the constant voltage tube a negative potential equal to the difference between these two is impressed upon the cathode of diode 38 and current immediately starts to flow into capacitor $C_9$. A negative voltage is thus impressed on the control grid of tube 35 which in turn reduces the sensitivity of the photomultiplier and therefore the magnitude of the voltage pulse appearing across $R_{28}$.

Condenser $C_9$ discharges thru $R_{23}$ and $R_{24}$ so that the voltage appearing across the control grid of tube 35 decreases unless it is intermittently energized. When a continuous series of light pulses is impressed on the cathode of the photomultiplier tube 18, an equilibrium condition is quickly established. This equilibrium is reached when the peak voltage pulses appearing across $R_{28}$ are just enough higher than the voltage of the constant voltage tube 36 to maintain a required charge on capacitor $C_9$. This charge on $C_9$ must be sufficiently high to provide a voltage on the control grid of tube 35 large enough to establish a degree of sensitivity in the photomultiplier to provide the voltage pulses across $R_{28}$ of the required value. If the peak voltage pulses appearing across $R_{28}$ rise higher than the equilibrium value described above, the voltage on the control grid of tube 35 will be increased and gain on the multiplier decreased. If peak voltage appearing across $R_{28}$ is less than the equilibrium value described, the charge on $C_9$ will leak off through $R_{23}$ and $R_{24}$ and the voltage on the control grid of 35 will decrease, thereby increasing the sensitivity of the photomultiplier tube. Since the constant voltage tube 36 maintains a potential of 105 v. and since it takes only about .2 v. change on the control grid of tube 35 to bring about a 5 to 1 change in photomultiplier sensitivity, it can be seen that the gain control system described has the ability to maintain constant photomultiplier sensitivity with a high degree of accuracy.

Figure 3:
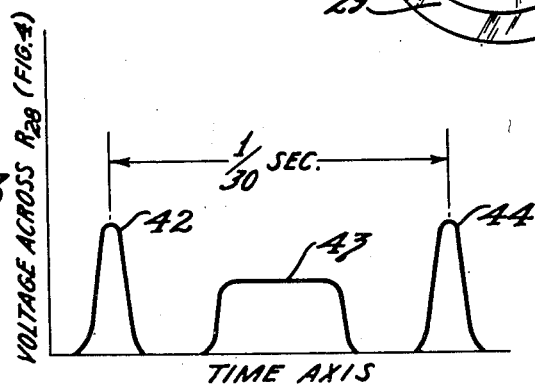
Fig. 3 is a graphical illustration comparing the gain control and the measuring pulses.

Since both the gain control pulses and the measuring pulses appear across $R_{28}$, the ones having the highest amplitude will of course be effective in setting the gain. As shown in Fig. 3, the measuring pulses 43 are always lower in amplitude than the gain control pulses 42 and 44. This is because of the load produced by capacitor $C_{10}$ and resistors $R_{30}$ and $R_{31}$ in the circuit of the meter 41. The meter may be a microammeter but if a permanent record is desired, there may be substituted an automatic recorder of which there are several types in common commercial use. The commutator 23 is on the same shaft as the rotating mirror 4. As shown in Fig. 1, the part 25 is made of a metal such as copper while the part 24 is made of an insulator such as Bakelite. The two brushes 26 and 27 are made of a conducting material such as carbon, or silver and carbon. It can be seen that brushes 26 and 27 are short circuited during a part of the revolution of mirror 4 and open circuited during the rest of the revolution. The circuit through the meter 41 is closed by the commutator just before the measuring pulse starts and is opened just after the measuring pulse is finished. Thus, the voltage appearing across $C_{10}$ is proportional to the height of the measuring pulse. The gain of the system is established by the gain control circuit in response to light reflected from the standard, and the capacitor C—9 causes this gain to be held substantially constant during the subsequent brief period during which light is being received by the photomultiplier from the test sample. The height of the measuring pulse is of course proportional to the amount of light reflected from the reflecting sample or transmitted through the transmission sample. If a microammeter is used, the reading will be adjusted to read full scale when the light is being reflected from a white standard inserted behind window 21. In the case of a reflecting test sample, a piece of the test surface is inserted in place of the standard and the percentage of reflection as compared to reflection from the standard is read on the meter. The meter is conveniently calibrated in percent.

In the case of a transmission sample, a reading on the meter 41 is first taken with sample 8 not present and a white standard inserted behind window 21. As in the previous example, the meter is set to read full scale. Then the sample, which could be a color filter, is inserted in the light beam as at 8 and another reading observed on the meter. Since less light will always be transmitted through a test sample than through air alone the reading on the meter will always be less than full scale and will be proportional to the percentage of light transmitted.

The lower half of diode 38 is used to allow capacitance $C_{10}$ to trap a charge which is a function of the peak amplitude of the measuring pulse. $R_{29}$ placed across this diode is a very high value and is for the purpose of obtaining a correct zero reading on the meter 41. Since both the gain control pulse and measuring pulse appear across $R_{28}$, it is necessary that all transient effects of the gain control pulse are dissipated before the measuring control pulse appears. To accomplish this, a diode 37 is placed across the resistor $R_{28}$. This tends to short circuit $R_{28}$ when the capacitor $C_8$ is discharging after the gain control pulse has reached its peak. The capacitor $C_8$ is thus able to discharge quickly and reestablish an equilibrium condition before the measuring pulse is received. The negative transient following the measuring pulse is also cleared away by means of diode 37 before the next gain control pulse appears. The resistor $R_{25}$ supplies a small bias voltage equal to the thermal voltage across diode 37.

The junction of capacitor $C_{10}$ and meter 41 is connected to the arm of potentiometer $R_{17}$ which supplies just sufficient voltage to balance thermal voltage from the lower half of diode 38. This is also for the purpose of obtaining zero reading on the meter when the height of the measuring pulse is zero.

The plate voltage for tubes 33, 34 and the supply for constant voltage tube 36 are obtained from a power supply consisting of transformer $T_4$, rectifier tube 39, filament transformer $T_3$ and a filter consisting of $C_6$, $C_7$ and $R_{27}$. A bleeder consisting of resistances $R_{14}$, $R_{15}$, $R_{16}$, $R_{17}$, and $R_{18}$ is placed across the constant voltage tube. The potential across the bleeder is thus maintained constant. The screen grid voltage for tube 33 is obtained from a tap between $R_{15}$ and $R_{16}$. The screen grid voltage for tube 35 is taken from potentiometer $R_{15}$. $R_{14}$ supplies the negative bias to the grid of tube 34. Cathode resistors $R_{13}$ and $R_{22}$ are inserted for the purpose of obtaining better linearity from the tubes and to obtain the best operating point on the tube characteristics.

The very sensitive gain control circuit described would ordinarily be subject to oscillations if the required conditions of attenuation and phase shift were not adhered to. In other words, the overall gain in the gain control system must be reduced to unity when the phase shift reaches 180°. The capacitors $C_1$ and $C_2$ are for the purpose of producing necessary attenuation with frequency so as to prevent oscillation. Resistors $R_{11}$ and $R_{23}$ are for the purpose of improving stability of the gain control circuit. $C_9$ must of necessity discharge quite slowly since the time constant of $R_{24}$ and $C_9$ is approximately 1 second. However, capacitor $C_9$ could ordinarily charge at a much faster rate. $R_{23}$ is for the purpose of limiting the speed at which capacitor $C_9$ can charge. $R_{11}$ is also for the purpose of limiting the speed at which $C_1$ can charge. It has been found in practice that $R_{23}$ and $R_{11}$ very greatly increase the stability of the circuit.

Circuit constants used in the circuit illustrated in Fig. 4 are as follows:

$R_1$ to $R_{10}$, inclusive,=270,000 ohms each
$R_{11}$=220,000 ohms
$R_{12}$=220,000 ohms
$R_{13}$=560 ohms
$R_{14}$=1,000 ohms
$R_{15}$=10,000 ohms
$R_{16}$=10,000 ohms
$R_{17}$=220 ohms
$R_{18}$=100 ohms
$R_{19}$=47,000 ohms
$R_{20}$=1 megohm
$R_{21}$=68,000 ohms
$R_{22}$=390 ohms
$R_{23}$=680 ohms
$R_{24}$=2.2 megohms
$R_{25}$=270 ohms
$R_{26}$=6,000 ohms
$R_{27}$=560 ohms
$R_{28}$=100,000 ohms
$R_{29}$=5.6 megohms
$R_{30}$=100,000 ohms
$R_{31}$=1.12 megohms
$C_1$=1.0 mfd.
$C_2$=0.0071 mfd.
$C_3$=0.10 mfd.
$C_4$=0.14 mfd.
$C_5$=0.10 mfd.
$C_6$=20 mfd.
$C_7$=20 mfd.
$C_8$=0.25 mfd.
$C_9$=1.0 mfd.
$C_{10}$=0.15 mfd.
$T_1$=610 v. (secondary)
$T_2$=2.5 v. (secondary)
$T_3$=6.3 v. (secondary)
$T_4$=250 v. (secondary)

The above described gain control circuit performs many valuable functions in the spectrophotometer. Through its regulation of the overall amplification factor of the complete amplification system it compensates for wide variations in line voltage which cause fluctuations in intensity of the light source. It takes care of inherent variations in spectral sensitivity always present in photomultiplier tubes. It provides adequately for variations in the intensity of the light source at various wave lengths. It takes care of variations in the general sensitivity of the multiplier due to fatigue. It also makes the instrument independent of sensitivity changes in tubes 33, 34, and 35, so that any good tube of the type specified can be selected from stock and used in the instrument interchangeably whereas in previous devices of this nature selection of the tubes had to be very carefully made and many trials often had to be made before a suitable tube could be found. Reflectivity changes in the interior of the integrating sphere are no longer a problem since the automatic gain control circuit also compensates for these. In short, there has been devised a thoroughly reliable instrument which, in tests, has proven itself capable of giving accurate readings in the hands of unskilled operators.

The gain control circuit does all this because it keeps the final voltage output of the amplifying system substantially constant during each period of time a pulse of light is being received by the photosensitive element from the light source other than the test sample. This pulse has been referred to more specifically as the gain control pulse and the light received during this pulse has been reflected from a white standard surface. This voltage output is maintained at substantially the same constant value during the subsequent measuring pulse which occurs while light is being received by the photosensitive element from the test sample.

The instrument can be used in all of the usual fields in which most spectrophotometers have proven useful and in a few where others have not proven satisfactory. For example, it can be used in color control work in the paint, varnish and dye industries. It can be used also in chemical analysis where split field colorimeters have mostly been used heretofore. Previous devices of this general type have not been able to be used where polarization of the reflected or transmitted light occurred in measurable degree. The present apparatus, however, can be used just as well in this field as in fields where no polarization occurs.

In addition to comparing color values, the device also provides an improved means for measuring the intensity of a light source compared to that of a standard. When used for this latter purpose, the same apparatus may be used with but slight modification. In this case and as also illustrated in Fig. 1, a standard light source may be placed at S. First, a reading is taken on the standard with the mirror behind the rotating disc 40 in position as shown at 5. Blocks of a white reflecting standard are inserted at both 9 and 12. The meter 41 is adjusted to full scale reading. The standard S is then removed from position at S and placed at $S^1$. A test source to be measured is placed at S and the mirror behind the rotating disc is changed to position $5^1$. The system is again set in operation with the disc 40 rotating and a new reading is taken on meter 41. The source $S^1$ then being used to set the overall gain of the amplifier and the proportional intensity of the test sample at S will be read on the meter 41 as a percentage of the intensity of light emitted by the standard. In this way, substandard lamps can be quickly detected or the candlepower may be determined. Light beams from the standard and the source being calibrated do not interfere with each other in any way. When the mirror is at position $5^1$ light from S will not be reflected from it along a path striking mirror 11. Likewise light from $S^1$ will be reflected off mirror 4 at an angle not sending it to mirror 6. Other modifications may also be made in the apparatus to enable it to be used as a photometer. For example, both standard and sample sources may be placed close together at S and rotating shutters used to direct the light from each properly synchronized with rotating disc 40.

The curve shown in Fig. 5 was obtained by plotting percentages of reflectance read from a microammeter where a certain bright yellow pigment on cardboard was the test sample. Other curves can just as easily be obtained for test samples which transmit light. The curve could also have been obtained using an automatic recorder in place of the meter.

The curve shown in Fig. 6 is a copy of one actually obtained in measuring a transmission test sample with apparatus constructed in accordance with the invention, the circuit diagram of which is shown in Fig. 4. In this case, the sample was a Wratten filter which transmits substantially no light between the wave lengths of 500 and 640 millimicrons.

Figure 2:
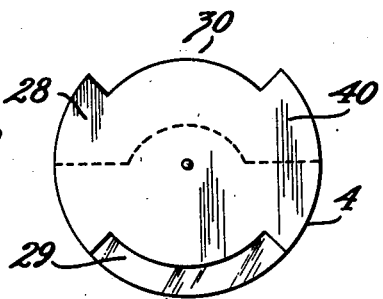
Fig. 2 is a front view of one type of rotating disc used in directing the light beam along alternate paths.

Although the form of the circuit and other features described are the preferred forms of the invention, certain changes may be made without departing from the inventive concept. For example, in one form, raw A.-C. was applied to the photomultiplier as a means of varying the voltage. Since the multiplier is self-rectifying, this gave pulses of current which were a function of voltage. With this form, a mirror on a rotating disc was also used but the mirror occupied a complete semicircle and the other half of the disc was cut away leaving no opaque non-reflecting surface as shown in Fig. 2.

With less satisfactory results, it is possible to use a higher input voltage, especially if an A.-C. supply is used, and omit the two tubes of the booster amplifier. This does not work as well as the form illustrated, however.

Other forms of optical systems may also be used, the one illustrated merely proving especially useful and convenient. Other white standards than magnesium carbonate can also be used—magnesium oxide, for example.

The motor 22 actually used in the completed apparatus was an 1800 R. P. M. capacitor type synchronous motor. Where an alternating current supply is used for the photomultiplier, a synchronous motor is a necessity. With a D.-C. supply, as shown in Fig. 2, a synchronous motor need not be used but it is preferable in order to eliminate "hum" since this "hum" would "beat" with the period of the motor if it were not synchronous.

Changes can also be made in the operation of the apparatus when used as a photometer which will enable it to measure light sources of higher candlepower than the standard. For instance, the meter 41 may be set at a scale reading lower than full scale when the reading is made on the standard.

There has thus been described an apparatus for conveniently comparing colors and light intensities which is free of many of the shortcomings found in prior art devices and which is adapted to a wide variety of uses.

I claim as my invention:

1. Apparatus for comparing light values received from a standard and from a test sample comprising a multistage photomultiplier tube including a photosensitive cathode, an anode and a plurality of dynodes, means for directing pulses of light alternately from said standard and from said sample to said cathode, means including a measuring circuit connected to said anode for measuring the relative intensity of the light pulses received from said test sample, means for applying potentials to each of said dynodes, means synchronized with the pulses received from said standard for varying the potentials on said dynodes such that the gain of said tube varies in inverse ratio to the intensity of light received by said cathode from said standard, and means for maintaining the value of said gain constant during the time light pulses are directed from said sample to said cathode.

2. Apparatus according to claim 1 including indicating means responsive to the output of said measuring circuit.

3. Apparatus according to claim 2 in which said means for directing pulses of light includes means for selectively varying the wave length of said light.

GLENN L. DIMMICK.

REFERENCES CITED

The following references are of record in the file of this patent:

UNITED STATES PATENTS

| Number | Name | Date |
| --- | --- | --- |
| 1,881,336 | Voigt | Oct. 4, 1932 |
| 1,932,337 | Dowling | Oct. 24, 1933 |
| 2,240,722 | Snow | May 6, 1941 |
| 2,361,549 | Kott | Oct. 31, 1944 |
| 2,411,741 | Michaelson | Nov. 26, 1946 |
| 2,442,910 | Thomson | June 8, 1948 |

OTHER REFERENCES

Journal of the Optical Society of America for October 1941, pages 633 to 638.

RCA Receiving Tube Manual, Copyright 1940 by RCA Manufacturing Company, Inc., pages 13-15 cited.